United States Patent
Westerhoff et al.

(10) Patent No.: US 8,392,529 B2
(45) Date of Patent: Mar. 5, 2013

(54) FAST FILE SERVER METHODS AND SYSTEMS

(75) Inventors: Malte Westerhoff, Berlin (DE); Detlev Stalling, Berlin (DE)

(73) Assignee: PME IP Australia Pty Ltd, Richmond (AU)

( * ) Notice: Subject to any disclaimer, the term of this patent is extended or adjusted under 35 U.S.C. 154(b) by 480 days.

(21) Appl. No.: 11/845,511

(22) Filed: Aug. 27, 2007

(65) Prior Publication Data
US 2009/0063658 A1 Mar. 5, 2009

(51) Int. Cl.
*G06F 15/16* (2006.01)
(52) U.S. Cl. ............ 709/219; 709/249; 709/250; 712/9; 711/168; 710/7; 710/10; 710/20; 710/21
(58) Field of Classification Search .......... 709/217–219, 709/249–250; 710/7, 20–21; 711/168, E17.007; 712/9; 717/149; 707/704, 764, E17.007
See application file for complete search history.

(56) References Cited

U.S. PATENT DOCUMENTS

| | | | |
|---|---|---|---|
| 5,355,453 A * | 10/1994 | Row et al. ..................... | 709/219 |
| 5,633,999 A * | 5/1997 | Clowes et al. ................. | 714/6.21 |
| 5,790,787 A * | 8/1998 | Scott et al. ..................... | 709/250 |
| 6,105,029 A * | 8/2000 | Maddalozzo et al. .......... | 1/1 |
| 6,807,581 B1 * | 10/2004 | Starr et al. ..................... | 709/250 |
| 7,003,547 B1 | 2/2006 | Hubbard | |
| 7,054,852 B1 | 5/2006 | Cohen | |
| 7,058,644 B2 | 6/2006 | Patchet | |
| 7,185,003 B2 | 2/2007 | Bayliss | |
| 7,299,232 B2 * | 11/2007 | Stakutis et al. ............... | 709/229 |
| 7,315,926 B2 * | 1/2008 | Fridella et al. ................ | 711/163 |
| 7,472,156 B2 * | 12/2008 | Philbrick et al. .............. | 709/201 |
| 7,502,869 B2 * | 3/2009 | Boucher et al. ................ | 709/250 |
| 7,506,375 B2 * | 3/2009 | Kanda et al. .................... | 726/25 |
| 7,552,192 B2 * | 6/2009 | Carmichael .................... | 709/217 |
| 2002/0016813 A1 * | 2/2002 | Woods et al. .................. | 709/107 |
| 2002/0049825 A1 * | 4/2002 | Jewett et al. .................. | 709/215 |
| 2002/0099844 A1 * | 7/2002 | Baumann et al. ............. | 709/232 |
| 2003/0120743 A1 * | 6/2003 | Coatney et al. ............... | 709/217 |
| 2003/0149812 A1 * | 8/2003 | Schoenthal et al. ........... | 710/36 |
| 2004/0133652 A1 * | 7/2004 | Miloushev et al. ........... | 709/214 |
| 2004/0210584 A1 * | 10/2004 | Nir et al. ......................... | 707/10 |
| 2004/0215858 A1 * | 10/2004 | Armstrong et al. ........... | 710/200 |
| 2004/0215868 A1 * | 10/2004 | Solomon et al. .............. | 710/317 |
| 2005/0066095 A1 * | 3/2005 | Mullick et al. ................ | 710/200 |
| 2005/0240628 A1 * | 10/2005 | Jiang et al. ................. | 707/104.1 |

(Continued)

OTHER PUBLICATIONS

PCT International Search Report and The Written Opinion of the International Searching Authority, dated Dec. 3, 2008, PCT Appl. PCT/US08/74397, filed Aug. 27, 2008.

*Primary Examiner* — Alina N. Boutah
(74) *Attorney, Agent, or Firm* — SCI-Law Strategies, PC

(57) ABSTRACT

The invention provides, in one aspect, an improved system for data access comprising a file server that is coupled to a client device or application executing thereon via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client by transferring requested data to the client device over multiple network pathways. That data can comprise, for example, directory trees, files (or portions thereof), and so forth.

21 Claims, 3 Drawing Sheets

U.S. PATENT DOCUMENTS

| | | | |
|---|---|---|---|
| 2006/0010438 A1* | 1/2006 | Brady et al. | 717/174 |
| 2006/0282253 A1* | 12/2006 | Buswell et al. | 703/22 |
| 2007/0067497 A1* | 3/2007 | Craft et al. | 709/250 |
| 2007/0185879 A1* | 8/2007 | Roublev et al. | 707/10 |
| 2008/0086557 A1* | 4/2008 | Roach | 709/224 |
| 2008/0115139 A1* | 5/2008 | Inglett et al. | 718/102 |
| 2008/0208961 A1* | 8/2008 | Kim et al. | 709/203 |
| 2008/0281908 A1* | 11/2008 | McCanne et al. | 709/203 |
| 2009/0043988 A1* | 2/2009 | Archer et al. | 712/31 |
| 2009/0077097 A1* | 3/2009 | Lacapra et al. | 707/10 |
| 2009/0147793 A1* | 6/2009 | Hayakawa et al. | 370/401 |
| 2010/0174823 A1* | 7/2010 | Huang | 709/230 |

* cited by examiner

FAST FILE SERVER METHODS AND SYSTEMS

BACKGROUND OF THE INVENTION

The invention pertains to digital data processing and, more particularly, to methods and apparatus for accessing and/or delivering data in a client-server environment. The invention has application in improving file and data access over local area networks, the Internet, and other networks.

Traditional file servers or network attached storage (NAS) devices support access requests received from networked client devices (e.g., PCs, workstations and the like) using network file system capabilities built in to the server operating system—which may be, for example, Linux or Microsoft Windows Server. Typically, these file systems, e.g. SMB/CIFS, allow the clients to access files and directories maintained on the server as if they were local to the requesting clients themselves—albeit, the transfers take place via the network and, as a result, are traditionally much slower.

Thus, for example, file transfers from a NAS to a client device may be as slow as 10-50 Mbyte/s, even if Gigabit-Ethernet—which has a theoretical peak bandwidth of ~110 Mbyte/s—is used as the network. The discrepancy is more pronounced when actual transfer speeds of 10-50 Mbyte/s are measured against the read performance delivered by fast RAID systems of the type often attached to high-performance file servers. Those RAID systems are capable of delivering at rates of 200-300 MByte/s, or even higher for sufficiently large sequential reads.

Data input/output (I/O) performance is a critical component in data intensive applications such as, by way of non-limiting example, signal processing applications, visualization applications, and the like.

An object of the invention is to provide improved methods and systems for digital data processing and, more particularly, by way of non-limiting example, for accessing and/or delivering data in a client-server environment.

A related object of the invention is to provide such methods and systems as improve the speed of data transfer between file servers and client devices.

A still further related object of the invention is to provide such methods and systems as reduce the gap between high RAID performance and the performance usable at the application level, e.g., when a network is disposed in between.

SUMMARY OF THE INVENTION

The foregoing are among the objects attained by the invention which provides, in one aspect, an improved system for data access comprising a file server that is coupled to a client device via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client device or an application executing thereon (collectively, "client") by transferring requested data to the client in parallel over multiple network pathways. That data can comprise, for example, directory trees, files (or portions thereof), and so forth.

Related aspects of the invention provide systems as described above in which the server stores a configuration file that is accessible by authorized clients (e.g., authorized applications executing on the client device) and that identifies one or more network interfaces over which the requested data can be transferred. Further related aspects of the invention provide systems as described above in which the configuration file additionally contains one or more security keys that can be used by the client and the server in connection with a requested data transfer.

Yet still further related aspects of the invention provide systems as described above in which the file system of the server controls access to the configuration file by the client. Such control can be based, for example, on access permissions associated with the configuration file and with the executing application.

Still further aspects of the invention provide systems as described above in which the client (e.g., an application executing on the client device) requests access to the configuration file and, if successful, generates a request for further data on the server. According to related aspects of the invention, the application generates such a request along with one or more of the security keys provided in the configuration file. In further related aspects of the invention, the application generates such a request on one or more network interfaces identified in that file. As noted above, the further data that is the subject of such a request can comprise, for example, directory trees, files (or portions thereof), and so forth.

Further aspects of the invention provide systems as described above in which the FFS functionality executing on (or in connection with) the server listens for requests on network interfaces identified in the configuration file. According to further related aspects of the invention, it listens only on those network interfaces that are connected to physically independent networks. Still further related aspects of the invention provide systems as described above in which the FFS functionality uses security keys provided with requests to validate those requests.

According to still further aspects of the invention, the FFS functionality responds to requests received from the client device by transferring requested data with the client via the multiple network connections over which those requests were received.

Further aspects of the invention provide systems as described above in which the server is coupled to multiple client devices via one or more networks. In such systems, the server responds to requests received from each client device by transferring requested data to that client device over multiple network pathways. According to related aspects of the invention, the configuration file specifies a different subset of network interfaces for each client (e.g., each client device and/or application executing thereon).

Still other aspects of the invention provide methods for transferring data between a server and one or more client devices paralleling the foregoing.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
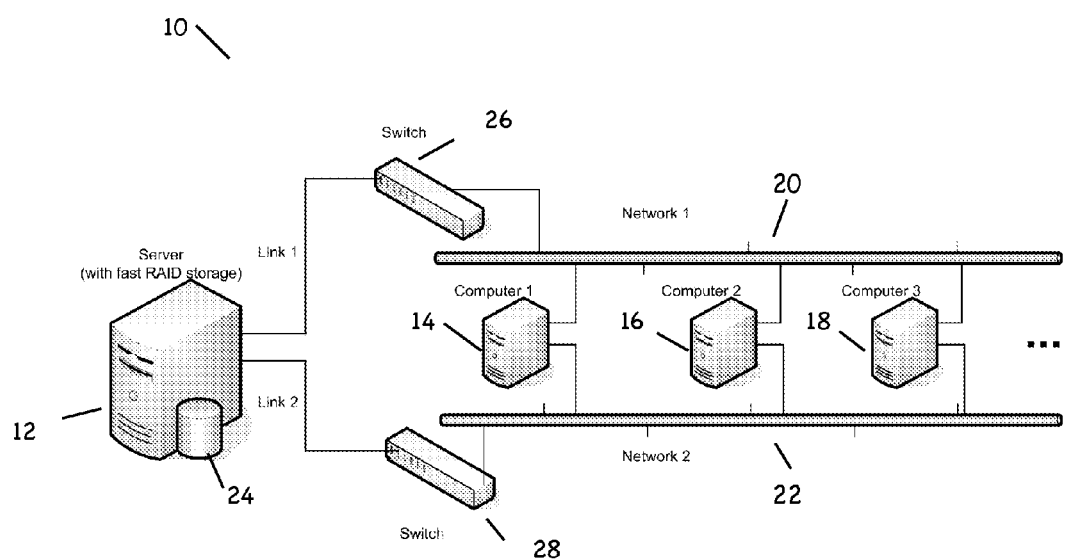
FIG. 1 depicts a digital data processing system according to the invention.
Figure 2:
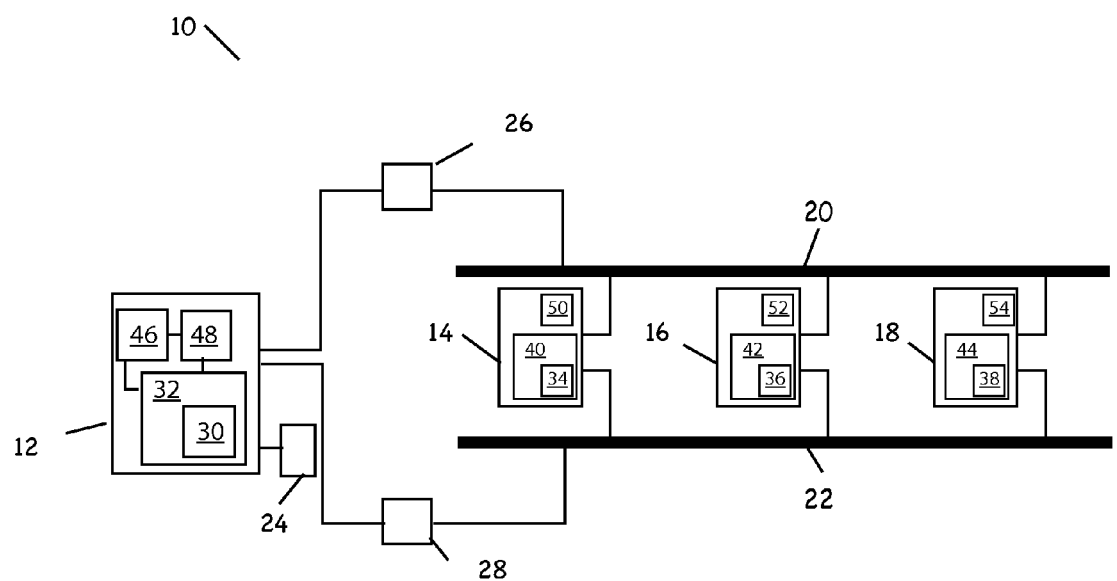
FIG. 2 is a further depiction of the digital data processing system of FIG. 1.

FIGS. 1 & 2 depict a digital data processing system 10 according to the invention. The system includes a file server 12 that is coupled to a client device 14 and, more typically, multiple client devices 14-18 via a network 20 and, more typically, multiple networks 20-22.

Server 12 may comprise a conventional file server and/or network attached storage (NAS) (collectively, "server" or "file server") of the type conventionally known in the art, as adapted in accord with the teachings hereof. Although only one server is shown in the drawing, it will be appreciated that the invention can be practiced with more such servers.

The server includes static storage that maintains user, application, enterprise or other data organized in the conventional manner known in the art—here, in one or more directories, each containing, zero, one or more files. In other embodiments, such data may be organized as serialized objects and/or in other manners known in the art. Storage device 24 typically comprises one or more disk drives (as shown) and, preferably, one or more high-speed RAID devices—though, in other embodiments, tape drives, ROM, RAM, Flash Memory, and/or CD-ROM devices may be used instead or in addition. Regardless, such storage device(s) 24 are of the type conventionally known in the art as adapted in accord with the teachings hereof.

The server 12 also comprises a file system 30 that forms part of and/or cooperates with a native operating system 32. Both of these components are of the type conventionally known in the art, as adapted in accord with the teachings hereof. Thus, for example, operating system 32 may comprise Linux or Microsoft Windows Server, both by way of non-limiting example and, file system 30 may comprise NTFS, EXT3, or XFS, again, by way of non-limiting example and by be exported by the operating system using a protocol such as SMB/CIFS or NFS, again, by way of non-limiting example. By way of said export protocols the file system 30 operates in cooperation with file systems 34-38 (discussed below) on the client devices 14-18 to provide authorized applications executing on the client device access to those directories and/or files.

Server 12 further comprises a fast file server (FFS) module 46—here, embodied in software executing on server 12, but in other instantiations embodied in hardware executing in conjunction with server 12—that responds to requests received from a client device 14-18 by transferring requested data (e.g., directory trees, files (or portions thereof), and so forth) with that client device over multiple networks 20-22.

Server 12 further comprises one or more configuration files 48 that store identities of one or more network interfaces over which the clients devices 14-18 may request data transfers. In preferred embodiments, the configuration file(s) 48 additionally store one or more security keys that can be used to validate and/or identify each requested data transfer. In the illustrated embodiment, the configuration files 38 are maintained in the conventional manner on storage unit 24, though, in other embodiments they may be stored elsewhere. The file(s) 48 may be text-based (e.g., XML), binary, or otherwise.

In the illustrated embodiment, file system 30 of the server 12 controls access to the configuration file(s) 48 in the conventional manner, e.g., using permissions (or other access controls) set so that only authorized users or applications (hereinafter, collectively, applications) executing on the client devices 14-18 can access the file(s) 48.

Networks 20-22 comprise local area networks (LANs), wide area networks (WANs), metropolitan area networks (MANs), or other networks of the type commonly known in the art supporting communications between client and server devices (and including conventional infrastructure, such as switches 26-28). These may be based in the Internet Protocol (IP) or other protocols, and they may include wireless, wired, satellite and/or other communication mechanisms of the type known in the art. The networks 20-22 may of the same variety (e.g., both megabit Ethernet, by way of non-limiting example) or of mixed varieties (e.g., megabit Ethernet and conventional Ethernet, again, by way of non-limiting example). Though two such networks are shown in the illustration, the invention contemplates a greater or lesser number thereof.

Client devices 14-18 comprise personal computers, workstations, embedded processors, single-board computers, personal digital assistants or other digital data processing device conventional in the art capable of cooperating in a client-server network and of executing software (here, referred to as "applications" or "software applications") requiring access to storage unit 24. In the illustrated embodiment, those devices are remotely disposed from the server 12 and coupled for communications with it via network media 20-22 operating in accord with the TCP/IP protocol. In other embodiments, one or more of the client devices 14-18 are coupled with the sever 12 via a combination of network media (e.g., Ethernet and so forth) as well as via direct wired or wireless media (e.g., USB interconnect, firewire interconnect, Bluetooth, infrared, and so forth). Those applications, labeled 50-54, respectively, executing on the respective client devices may comprise signal processing applications, visualization applications, and so forth. The client devices 14-18 may be of the same and/or mixed varieties. And, though shown in the drawing coupled to server 12 via a common set of networks 20-22, may be so coupled on sets of disparate (and/or, possibly overlapping) networks.

Like server 12, client devices 14-16 comprise respective file systems 34-38 that form part of and/or cooperate with respective native operating system 40-44. These, too, are of the type conventionally known in the art, as adapted in accord with the teachings hereof. Thus, for example, operating systems 40-44 may comprise Linux or Microsoft Windows XP, both by way of non-limiting example; and, file systems 34-38 may comprise SMB/CIFS or NFS clients, again, by way of non-limiting example.

Operation

Figure 3:
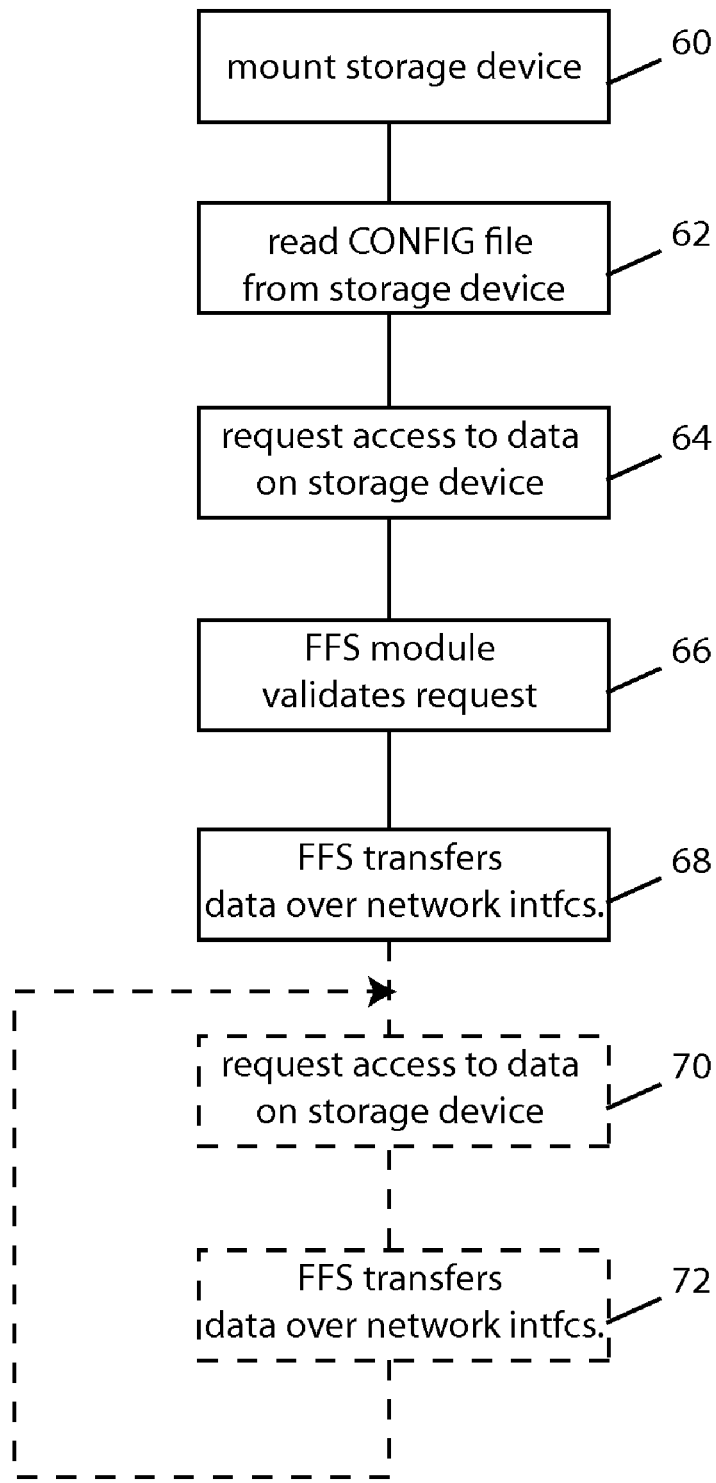
FIG. 3 depicts a method of operation of the system of FIG. 1.

FIG. 3 depicts operation of the system 10 in connection with a client request for access to storage 24. Although the discussion focuses on requests by application 50 of device 14, it will be appreciated that requests by other applications and/or devices (collectively, "clients") proceed similarly.

In step 60, client device 14 mounts storage device 24 (or a volume therein) as a "share" (in Windows terminology) or otherwise. This can be effected by a user of device 14, application 50 executing thereon and/or by the operating system 40 (e.g., as part of a start-up routine), though for purposes of the discussion that follows, mounting will be assumed to be effected by the application 50. Mounting proceeds in the conventional manner, as mediated by the operating system 40, file system 34 of the client device, and file system 30 of the server. Per convention, any and/or all of these may prohibit mounting unless the requesting user and/or application 50 has appropriate security permissions.

Assuming mounting is successful, client application 50 requests access to configuration file 48 on storage device 24. See step 62. In the illustrated embodiment, this is for READ access to the file 48, though, other embodiments may provide for WRITE, LOCK, or other access to that file 48. Regardless, processing of the request for (read) access proceeds in the conventional manner, as mediated by the operating system 40, file system 34 of the client device 14, and file system 30 of the server. As above and per convention, any and/or all of these may prohibit access unless the requesting user and/or client application 50 has appropriate security permissions.

Assuming access to file 48 is granted, the client application 50 obtains from that file 48 identifications of network interfaces (e.g., ports) and security keys. The client application 50 then generates a request for access to data (e.g., a directory tree, file or portion thereof) using those IDs and keys. See step 64. In the discussion that follows, this is assumed to be a request for READ access, although, requests for OPEN, CLOSE, SEEK, WRITE, DELETE FILE, RENAME FILE, MOVE FILE, and so forth, access are similarly handled. The commands are issued in the conventional ordering (e.g., READ, WRITE OR CLOSE following OPEN) and can specify a previously opened file or a file name.

Although, in some embodiments, the access request of step 62 can be made via the respective file systems 40, 34, in the illustrated embodiment, that request is made directly by client application 50 to the FFS module 46 of the server 12. To this end, the protocol for communications between the client application 50 and FFS module 46 can be simpler and/or more specialized than traditional file system access requests, thereby facilitating higher performance than standard network file systems. Moreover, that protocol can be implemented on top of physical or logical network layers which are not supported in a straight forward way by standard network file systems. An example is DAPL on Infiniband networks.

The request specifies the data structure (e.g., directory tree, file, etc.) to be accessed, as well as the security keys (identified in the configuration file 48) for identifying and validating the request. In the illustrated embodiment, the request is transferred, in parallel, over each network interface (identified in the configuration file 48) over which the client application 50 specifies access to occur, though, in other embodiments, the request may be transmitted by remote procedure call (RPC), COM, DCOM, CORBA or otherwise, and may include identifiers for each such network interface.

In step 66, the FFS module 46—which, in the illustrated embodiment, listens for requests on network interfaces identified in the configuration file 48—validates the request received in step 64. This includes verifying that the security keys provided in the request are valid, that the application 50 has permission (per the file system 34) for access to the requested data (e.g., directory tree and/or file) and that network interfaces specified for the request are available for the transfer. In some embodiments, the FFS module 46 listens for and/or validates requests only for transfers on physically independent networks. In some embodiments, the FFS module 46 can implement validation independently of the file system 32. In other embodiments, it utilizes the operating system 32 and file system 30 for at least some of these purposes.

Assuming the FFS module 46 validates the request, the module 46 mediates the data transfer as between the storage device 24 (via the server's file system 32) and the client application 50 (via the specified interfaces to networks 20-22). For example, in the case of a READ operation, the FFS module obtains the requested data (e.g., file blocks or directory tree) and transmits it to the application 50 concurrently over the multiple network pathways specified by those interfaces. See step 68. Thus, typically, for example, the FFS module transmits the requested data to the client application 50 over two or more separate networks 20, 22; however, it may (depending on the specified interfaces) send the data over two separate channels on the same network (e.g., as where per-channel bandwidth is rate-limited). In the case of WRITE or other operations, the FFS exchanges the requisite information with the client application 50 over those interfaces and duly writes it to the storage device 24.

Once the FFS module 46 has validated access to a given file, directory tree and so forth, the application 50 may continue making requests (e.g., successive read or write requests) without further validation. This is reflected in steps 70-72.

Although the discussion focuses on responses by FFS module 46 to requests from client application 50 executing on device 14, the module 46 responds similarly to other applications on that device 14, as well as to other applications on other devices 16-18. Thus, the FFS module 46 of the illustrated embodiment responds to requests received from each such client by transferring requested data to that client over multiple network interfaces—and, therefore, network pathways—specified in the request. These may be common sets of pathways, partially overlapping sets of pathways, or entirely disparate sets of pathways.

Example

An example of an implementation of system 10 for medical visualization is as follows. In the implementation described here, the client devices 14-18 are presumed to be visualization servers, which process large medical image studies stored on the file server 12. Upon selection of a study by a user, the data has to be loaded as fast as possible to minimize waiting time.

FFS module 46 is implemented as a process (e.g. a Windows™ service) running on file server 12, subsequently referred to as "Service." Upon startup, the Service writes a file (configuration file 48) into each directory tree to be "exported," i.e., available for access by a client device 14-18. Those directory trees are exported as standard Microsoft Windows Shares. The configuration file 48 has read permissions which are as restrictive as the most restrictive read permissions of any of the files in that directory tree. The configuration file 48 contains an access key randomly generated by the Service, as well as IP addresses of the network interfaces of the file server and the TCP/IP port on which the Service listens for incoming connections.

Each client device 14-18 which has access to the Windows Share and has permission to read the configuration file 48 can use the FFS module 46 for fast file transfer. It connects to the network interfaces and port specified in the configuration file 48. It transmits the contents of the access key (thereby proving that it had read permission to the configuration file 48). On the connection linked to each of the network interfaces the same session key is transmitted, thereby associating these links with one logical connection.

A data read command is satisfied by the Service using multiple simultaneous threads and double buffering. One thread reads the data from the disk 24 or RAID device. One thread per network interface transmits the data. Thereby effectively parallelizing disk read and concurrent data transmission on all network interfaces.

CONCLUSION

Described above are systems and methods meeting the aforesaid objects, among others. It will be appreciated that the embodiments shown and described herein are merely examples of the invention and that other embodiments incorporating changes therein fall within the scope of the invention. Thus, by way of non-limiting example, it will be appreciated that the invention can be practiced with peer-to-peer networks, grid networks and so forth, wherein the role of "server" is played by a set of one or more devices in such networks and the role of "client" is played by a set (possibly overlapping) of one or more (other) devices in the network.

The invention claimed is:

1. An improved system for data access comprising
   a file server;
   a plurality of networks; and
   a client device in communication with the file server by the plurality of networks in parallel, the client device receives a configuration file from the file server, the configuration file identifies at least two networks of the plurality of networks, the client device requests data stored on the file server by transmitting requests in parallel over the at least two networks identified in the configuration file, the client device receives the data stored on the file server over the at least two networks, each of the at least two networks comprise physically independent networks, the file server transmits the data stored on the file server concurrently over the at least two networks.

2. The system of claim 1, wherein one or more of the at least two networks operate in accord with the Internet Protocol (IP).

3. The system of claim 1, wherein one of the at least two networks comprises a local area network (LAN), wide area network (WAN), or metropolitan area network (MAN).

4. The system of claim 1, wherein the configuration file additionally contains one or more security keys that can be used by the client device and the file server in connection with a requested data transfer.

5. The system of claim 1, wherein the file server comprises a file system operable, in cooperation with a file system on the client device, to provide access to directories and/or files requested by the client device.

6. The system of claim 1, wherein the file system of the file server controls access to the configuration file.

7. The system of claim 6, wherein the file system of the file server controls such access by way of access permissions associated with the configuration file.

8. An improved system for data access comprising
   a file server;
   a plurality of networks; and
   a plurality of client devices, each client device is in communication with the file server by the plurality of networks in parallel, the file server transmits a configuration file to a first client of the plurality of client devices, the configuration file identifies at least two networks of the plurality of networks, the configuration file specifies a different subset of network identifications for each of the plurality of client devices, the file server receives from the first client requests for data stored on the file server in parallel over the at least two networks identified in the configuration file, the file server concurrently transmits over the at least two networks the data stored on the file server to the first client, each of the at least two networks comprise separate networks.

9. The system of claim 8, wherein one or more of the at least two networks operate in accord with the Internet Protocol (IP).

10. The system of claim 8, wherein one of the at least two networks comprises a local area network (LAN), wide area network (WAN), or metropolitan area network (MAN).

11. The system of claim 8, wherein the configuration file additionally contains one or more security keys that can be used by the client device and the file server in connection with a requested data transfer.

12. The system of claim 8, wherein the file server comprises a file system operable, in cooperation with a file system on the client device, to provide access to directories and/or files requested by the client device.

13. The system of claim 8, wherein the file system of the file server controls access to the configuration file.

14. The system of claim 13, wherein the file system of the file server controls such access by way of access permissions associated with the configuration file.

15. An improved method for data access, comprising:
    receiving a configuration file from a storage device;
    reading the configuration file, the configuration file includes a plurality of network identifications, each network identification of the plurality of network identifications is associated with a different network of a plurality of networks in communication with the storage device;
    requesting access to data stored on the storage device, the requesting access includes transmitting requests in parallel over at least two networks identified in the configuration file, each of the at least two networks comprise physically independent networks; and
    receiving the data stored on the storage device over the at least two networks, the storage device transmits the data stored on the storage device concurrently over the at least two networks.

16. The method of claim 15, wherein:
    the step of requesting access to data stored on the storage device is made directly to a FFS module on the storage device.

17. The method of claim 15, wherein:
    the step of requesting access to data stored on the storage device includes requesting read access.

18. The method of claim 15, wherein:
    the step of receiving the data stored on the storage device includes receiving the data concurrently over the at least two networks.

19. The method of claim 15, wherein:
    the configuration file specifies a different subset of network identifications for each client.

20. The method of claim 15, wherein:
    the configuration file includes one or more security keys for validating each requested data transfer.

21. The method of claim 15, wherein:
    each of the at least two networks comprise local area networks.

* * * * *